Aug. 26, 1941.　　　F. T. HARRIS　　　2,254,069
SIPHON BREAKING VALVE
Filed May 17, 1938　　　2 Sheets-Sheet 1

INVENTOR
F. T. Harris
BY
ATTORNEY

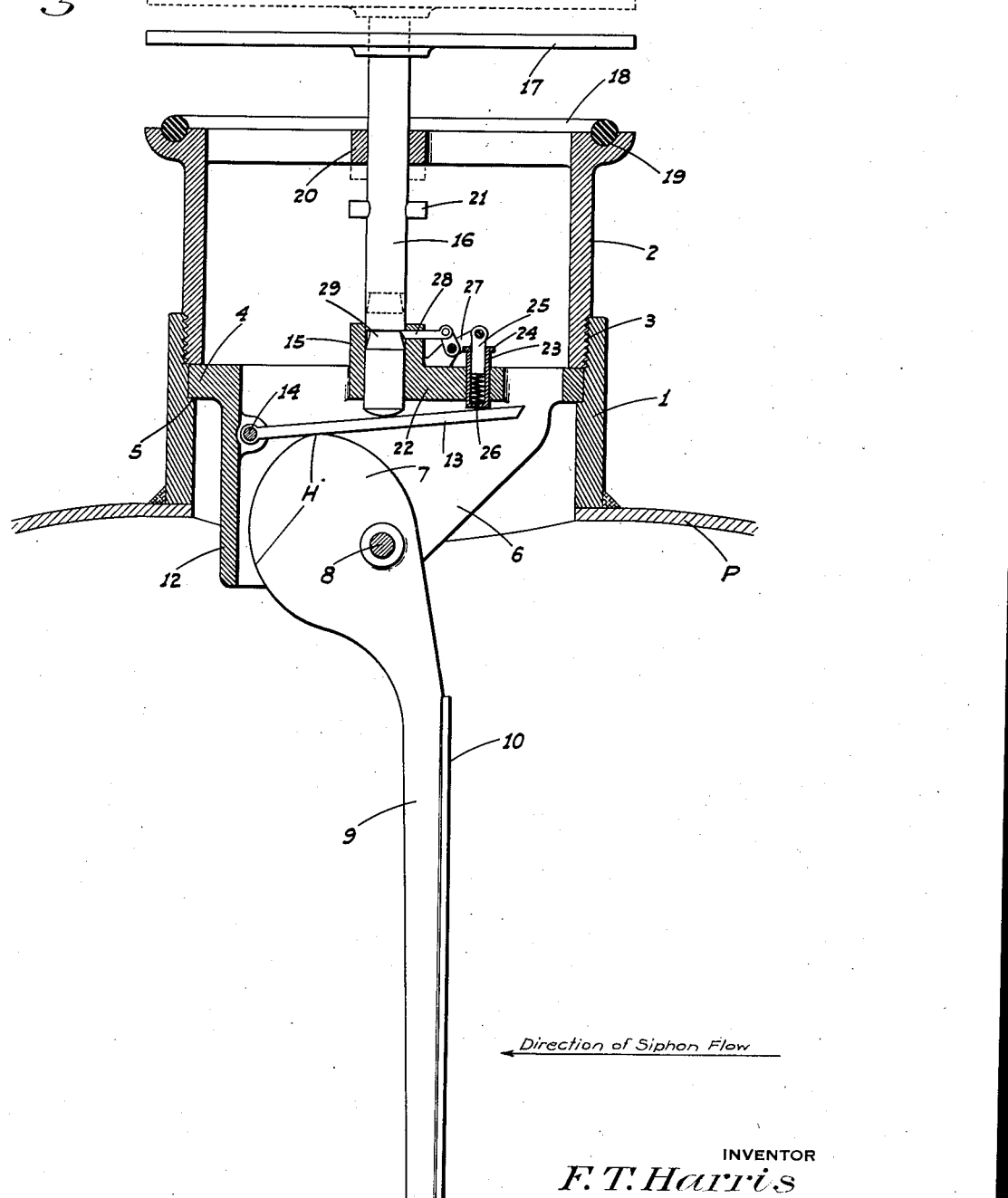

Patented Aug. 26, 1941

2,254,069

UNITED STATES PATENT OFFICE 2,254,069

SIPHON BREAKING VALVE

Frank T. Harris, Lodi, Calif.

Application May 17, 1938, Serial No. 208,426

6 Claims. (Cl. 137—152)

This invention relates generally to automatic relief valves, and in particular the invention is directed to an automatic siphon breaking valve.

In certain agricultural areas, such as the delta region in the San Joaquin Valley of California, the land which is tilled is surrounded by levees and lies below the surface level of the many waterways which flow through such region. As a result, when an area has been irrigated, the surplus water must be pumped from the land level up and over the levees and into the waterways. The pumping pipe, which extends over the levee, is of inverted U shape and the pump is interposed therein at a point adjacent the intake. The discharge end of the pipe terminates in the waterway below the surface and is usually provided with a flap valve to prevent siphoning back of the river water when the pump is shut down. However, debris sometimes holds the flap valve open and the water siphons back to the pump pick up basin, resulting in the pump being started. The pumps are electric, and as the water rises in said basin, a float controlled switch is closed. As the pump starts, it must work against the back flow of the siphoning water and the resultant strain often damages the pump or blows the motor fuses. This results not only in equipment damage, but the water continues to siphon back and often causes serious damage to crops, etc., before the trouble is discovered.

It is therefore the principal object of my invention to provide an automatic valve which is interposed in the pumping pipe at its crest; said valve being arranged to function to break the siphon in said pipe when the pump is shut off.

A further object of the invention is to provide a valve, as above, which functions to relieve the air pressure in the pipe when the pump is started.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a similar view but with the valve open.

Figure 3:
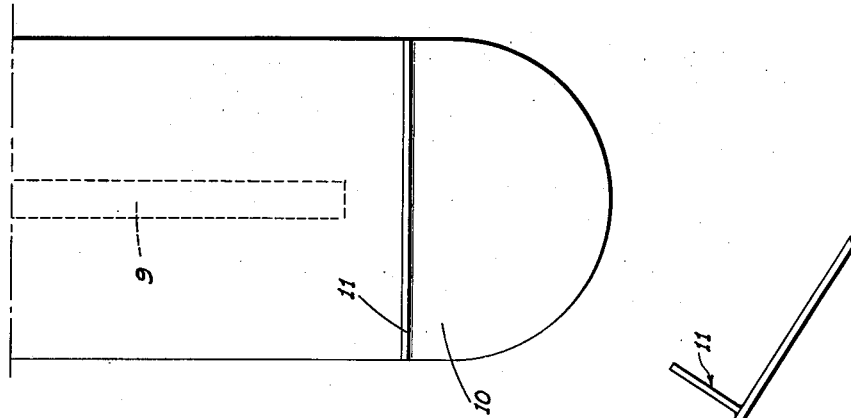
Figure 3 is a fragmentary back view of the lower end of the vane, and illustrating the transverse wing thereon.

Referring now more particularly to the characters of reference on the drawings, the device comprises a vertical, open-ended casing including a lower cylindrical member 1 into which an upper cylindrical member 2 is threaded as at 3. The member 1 is fixed by welding or the like on the pumping pipe P at the crest thereof; the pipe having an opening therein registering with said member.

A ring 4 is fixed in the casing in engagement with a shoulder 5 by means of member 2 which, when threaded into place, abuts at its lower end against said ring. Laterally spaced, parallel side plates 6 are formed in connection with and depend from ring 4 a short distance into pipe P.

A flat cam 7 is pivoted at 8 for movement between side plates 6. A radial arm 9 is formed with the cam and extends into the pipe P; there being a flat vane 10 fixed on one edge of the arm and projecting beyond the lower end thereof, the surface of said vane being disposed at right angles to the direction of flow in the pipe. A transverse wing 11 is fixed on the vane adjacent its lower end and extends at right angles from the back surface thereof and against which surface the flow impinges when a siphon action occurs.

An end wall 12 extends between the side walls and not only keeps debris from the cam but also provides a support for a tappet which comprises a finger 13 pivoted at 14 on said end wall for swinging movement in a vertical plane between the side walls. A central sleeve 15, fixed in connection with the side plates, surrounds a vertically slidable stem 16 having a circular valve plate 17 fixed on its upper end and arranged to seat against a resilient sealing ring 18 carried in a groove 19 formed in the upper edge of member 2. Another spider supported sleeve 20 surrounds the stem 16 adjacent its upper end. A radial cross pin 21 limits upward movement of the stem.

The sleeve 15 is provided with an extension 22 through a vertical opening in which a cylindrical cup 23 slidably extends, a flange 24 on the upper edge of said cup preventing escape thereof. A piston 25 is disposed in the cup and a normally slack compression spring 26 is mounted in the cup between the cup bottom and inner end of the piston. The upper end of the piston is pivoted to one end of a ball crank lever 27, the other end of such lever being pivoted to a latch pin 28 supported in a radial hole in sleeve 15. Pin 28 is adapted to cooperate with an upwardly facing bevel groove 29 cut in stem 16.

*Operation*

Figure 1:
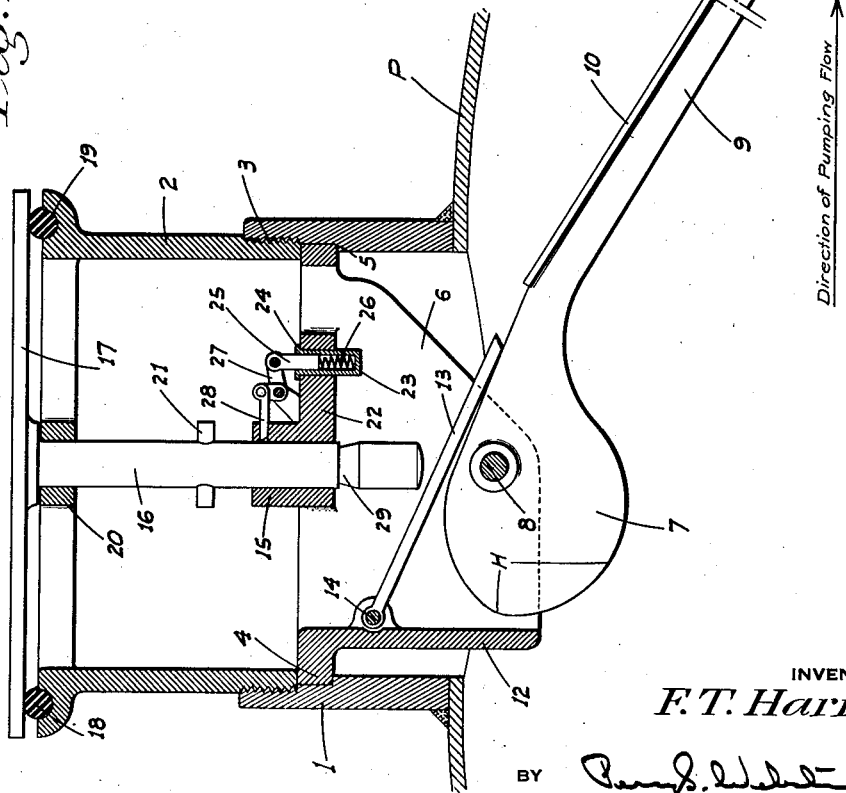
Figure 1 is a side elevation, mainly in section, illustrating the valve in closed position.

When water is being pumped through pipe P in the direction shown by the arrow in Fig. 1, the valve is closed as shown in such figure of the drawings. The valve remains closed when the pumping operation is in process for the reason that the flow of water impinges against one face of vane 10, causing such vane and connected arm 9 to swing upward in the direction of flow, which results in cam 7 being held with its high point H free of the pivoted tappet finger 13. When the tappet is in such position, the stem 16 is in fully lowered position and circular valve plate 17 is then in engagement with sealing ring 18. The water passing through pipe P produces a suction in the casing and maintains plate 17 in positive engagement with the sealing ring.

However, when the pump is shut off and the flow of water through pipe P reverses by reason of resulting siphon action, arm 9 swings down to and thence beyond a vertical position. Wing 11 of the vane 10 makes such vane more responsive to such siphon flow. When the arm 9 is in such position, the high point H of the cam 7 has engaged and lifted finger 13 to a substantially horizontal position, as shown in Fig. 3. When this occurs, finger 13 engages the lower end of stem 16 and raises said stem 16 and valve plate 17 to the position shown in full lines in Fig. 2. Also, the free end portion of finger 13 engages the lower end of cup 23 and raises the same. As a result, piston 25 is urged upwardly under the influence of compression spring 26, forcing latch pin 28 into the upwardly facing groove 29 in stem 16. When the stem 16 has thus been latched, the weight of the stem 16 and valve plate 17 is carried on latch pin 28 preventing withdrawal of said pin from the groove 29 until the valve plate pops upward when the pump starts and as will hereinafter appear. Thus, incidental fluctuations of the cam caused by movement of vane 10, and which may occur under certain conditions after the pump has been shut off, have no effect on the latched stem and valve. The valve plate 17 thus remains open from the time that the pump is shut off until it is again started, and with the valve plate open it is impossible for the river water to siphon back through pipe P, as any tendency to siphon has effectively been broken.

When the pump is again started, there is an initial surge of air, which causes valve plate 17 to pop upward from the position shown in full lines to that shown in dotted lines in Fig. 2. When this occurs, the stem engaging end of pin 28 rides up the beveled face of groove 29, forcing the pin outward and free of said stem and reseating cup 23. Thereafter the stem 16 lowers, bringing plate 17 into a valve closing position, such lowering of stem 16 taking place without interference as the initial flow of water has swung vane 10 and arm 9 upward and moving the high spot of the cam away from finger 13.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An air admission valve assembly including a casing open at one end to atmosphere, a self-closing valve mounted in connection with and normally closing the casing to atmosphere, a movable member supported and projecting from the casing, said member being adapted to be moved in one direction from a predetermined initial position, means cooperatively engaged between the member and valve and arranged to enable the latter to close when the member is moved in said one direction and to open the valve when the member returns to said initial position, and normally inactive releasable catch means to engage and prevent reclosing of the valve when opened; said means being operative, upon return of the member to said initial position, to place the catch means in functioning condition.

2. An assembly as in claim 1 in which the valve is adapted for further opening movement than that imparted thereto by said means upon return of the member to said initial position; the valve including means to release the catch means and return same to the normal inactive position thereof upon the occurrence of such further opening movement of the valve and said member has assumed a position away from its initial position.

3. An air admission valve assembly including a self-closing valve having an actuating stem, a movable member arranged when moved to one position to enable the stem to move in a valve closing direction and when moved to another position to cause the stem to be moved in a valve opening direction, the stem having a circumferential groove therein beveled axially of the stem to face in a valve opening direction, a latch pin disposed radially of the stem and normally clear of the plane of the groove, and means between the pin and said member to advance the pin into said groove upon movement of said member to said other position and resultant movement of said stem in a valve opening direction and to the point of alinement of the pin and groove.

4. An assembly as in claim 3 including a pivoted tappet finger movable in a direction to engage the end of the stem, said finger being actuated by said member; and in which assembly said pin advancing means includes a normally slack compression spring disposed at substantially right angles to the finger in position to be compressed thereby upon movement of said member to said other position and resultant movement of the finger, and a linkage connection between the spring and pin tending to advance the latter when the spring is compressed.

5. An air admission valve assembly comprising a vertical open ended casing, a normally closed valve plate for the upper end of the casing, a stem depending from the plate centrally thereof, a guide sleeve surrounding a portion of the stem, a cam below the stem, means in the casing pivotally supporting the cam for rotative movement in a vertical plane, and means between the cam and stem to raise said stem upon rotation of the cam in one direction; said means comprising a finger pivoted at a point laterally offset from the stem for vertical swinging movement, the finger projecting from its pivot and engaging the lower end of the stem, and the cam engaging the finger from beneath intermediate said pivot and stem.

6. An air admission valve assembly including a self-closing valve, a movable member arranged when moved to one position to enable the valve to close and when moved to another position to cause the valve to open, and a normally retracted latch device arranged to be advanced, upon predetermined opening movement of the valve, into releasable latching engagement therewith and to hold the same open; said latching device being advanced into latching engagement with the valve by said member and upon movement thereof to said other position, the valve being arranged for opening movement further than said predetermined extent and including means cooperating with said latch device and acting thereon to positively return the latter to its normally retracted position upon occurrence of said further opening movement of the valve.

FRANK T. HARRIS.